United States Patent
Ferdous et al.

(10) Patent No.: US 9,069,881 B2
(45) Date of Patent: Jun. 30, 2015

(54) ADAPTATION OF PROBING FREQUENCY FOR RESOURCE CONSUMPTION

(75) Inventors: Rashed Ferdous, Rochester, MN (US); Arthur J. Meyer, III, Oronoco, MN (US); Carlos P. Sosa, Eagan, MN (US)

(73) Assignee: International Business Machines Corporation, Armonk, NY (US)

(*) Notice: Subject to any disclaimer, the term of this patent is extended or adjusted under 35 U.S.C. 154(b) by 59 days.

(21) Appl. No.: 13/345,806

(22) Filed: Jan. 9, 2012

(65) Prior Publication Data
US 2013/0179893 A1 Jul. 11, 2013

(51) Int. Cl.
G06F 9/46 (2006.01)
G06F 15/173 (2006.01)
G06F 11/30 (2006.01)
G06F 11/34 (2006.01)
G06F 9/50 (2006.01)

(52) U.S. Cl.
CPC ........ G06F 11/3096 (2013.01); G06F 11/3089 (2013.01); G06F 11/3409 (2013.01); G06F 2201/81 (2013.01); G06F 9/50 (2013.01); G06F 2209/503 (2013.01); G06F 2209/508 (2013.01); G06F 11/3093 (2013.01)

(58) Field of Classification Search
None
See application file for complete search history.

(56) References Cited

U.S. PATENT DOCUMENTS

| | | | | |
|---|---|---|---|---|
| 6,985,825 | B1* | 1/2006 | Good et al. | 702/83 |
| 8,527,626 | B1* | 9/2013 | Wang et al. | 709/224 |
| 8,543,711 | B2* | 9/2013 | Rolia et al. | 709/229 |
| 2002/0183972 | A1 | 12/2002 | Enck et al. | |
| 2003/0140090 | A1* | 7/2003 | Rezvani et al. | 709/203 |
| 2004/0153537 | A1* | 8/2004 | Rezvani et al. | 709/223 |
| 2005/0125797 | A1 | 6/2005 | Gabrani et al. | |
| 2007/0011683 | A1* | 1/2007 | Helander | 718/104 |
| 2008/0082983 | A1 | 4/2008 | Groetzner et al. | |
| 2008/0178188 | A1 | 7/2008 | Cooke et al. | |
| 2008/0253393 | A1* | 10/2008 | Blackburn et al. | 370/468 |
| 2008/0263563 | A1* | 10/2008 | Diao et al. | 718/105 |
| 2009/0313282 | A1* | 12/2009 | Bhagwan et al. | 707/102 |
| 2010/0004916 | A1* | 1/2010 | Stauder et al. | 703/17 |
| 2010/0058349 | A1 | 3/2010 | Diwakar et al. | |
| 2010/0083263 | A1* | 4/2010 | Machida | 718/102 |
| 2010/0131959 | A1 | 5/2010 | Spiers et al. | |
| 2010/0208069 | A1* | 8/2010 | Rezvani et al. | 348/143 |
| 2010/0242045 | A1 | 9/2010 | Swamy et al. | |
| 2011/0023026 | A1 | 1/2011 | Oza | |
| 2011/0320546 | A1* | 12/2011 | Holden | 709/206 |
| 2012/0030679 | A1* | 2/2012 | Ferdous et al. | 718/101 |
| 2012/0170569 | A1* | 7/2012 | Al-Khudairi | 370/346 |

FOREIGN PATENT DOCUMENTS

JP 2005004336 1/2005

OTHER PUBLICATIONS

Caron et al., Forecasting for Grid and Cloud Computing On-Demand Resources Based on Pattern Matching, 2nd IEEE International Conference on Cloud Computing Technology and Science, pp. 456-463, 2010.

Garousi et al., A UML-Based Quantitative Framework for Early Prediction of Resource Usage and Load in Distributed Real-Time Systems, University of Calgary, pp. 275-302, 2008.

Goswami et al., Prediction-Based Dynamic Load-Sharing Heuristics, IEEE Transactions on Parallel and Distributed Systems, vol. 4, No. 6, Jun. 1993.

Eranian, Perfmon2: a flexible performance monitoring interface for Linux, Hewlett-Packard Development Company, L.P., Jul. 2006, pp. 1-30.

* cited by examiner

Primary Examiner — Abdullah Al Kawsar
(74) Attorney, Agent, or Firm — Lieberman & Brandsdorfer, LLC (57) ABSTRACT

Embodiments of the invention relate to dynamically assessing and managing probing of a system for resource availability. A predicted resource usage pattern is acquired, and critical points in the pattern pertaining to predicted changes in resource consumption are identified. Probing the system for resource availability is limited to the identified critical points, or to real-time changes in the resource usage pattern.

19 Claims, 5 Drawing Sheets

ADAPTATION OF PROBING FREQUENCY FOR RESOURCE CONSUMPTION

BACKGROUND

1. Technical Field

The present invention relates to a method and system for determining that resources are available to an application to support its processing of an input file. More specifically, the invention relates to a system and method that dynamically changes its probing frequency for resource utilization based on a pre-determined resource consumption pattern associated with the application input file.

2. Description of the Prior Art

Processing any computer implemented job requires resources, and more specifically, availability of resources at specific times. Starvation is a known term that depicts the unavailability of one or more required resources to support processing of a job. Resource intensive jobs require a wide range of support, but not necessarily in a continuous manner. For example, a resource intensive job may have periods that require an increased availability to support processing and other periods that have a low level of resource utilization requirement. Probing a system for resource utilization determines availability of resources to support the job to be ascertained. At the same time, the act of probing the system places a burden on system, and possibly network, resources that may otherwise be used to support one or more active jobs.

SUMMARY OF THE INVENTION

This invention comprises a method, system, and computer program product for dynamically modifying the frequency at which job resource usage and system resource availability is probed.

In one aspect, a computer implemented method is provided for managing the frequency of probing resource usage and associated resource availability. An application input file is analyzed and an input resource consumption pattern is produced. The input resource consumption pattern is related to the application's processing of the input file. The resource consumption pattern demonstrates the usage of resources to support the input application processing over time. Once the resource consumption pattern is produced, a probing frequency for querying availability of resources is set. At the time of processing, both system resource availability and application resource utilization for processing the input file are monitored. The probing frequency is dynamically changed for one or more select periods of time as determined by the resource consumption pattern.

In another aspect, a system is provided with a processing unit in communication with memory. The processing unit supports processing an input file. A functional unit is provided in communication with the processing unit, with the functional unit to support dynamic modification of a probing frequency for application processing in conjunction with resource utilization and associated resource availability. The functional unit is provided with an input manager, a frequency manager, a monitor manager, and a director. The input manager functions to analyze an application input file; the input pattern is related to application processing. More specifically, the input manager produces an input resource consumption pattern related to the application's processing of the input file. The frequency manager, which is in communication with the input manager, functions to set a frequency at which system resource availability is probed. The monitor manager, which is in communication with the frequency manager, monitors both the availability of system resources and application resource utilization for processing the input file. The director, which is in communication with the monitor manager, functions to dynamically change the probing frequency for one or more select periods of time based upon the resource consumption pattern.

In yet another aspect, a computer program product is provided to support probing of resource availability to support resource consumption. The computer program product includes a computer-readable storage medium having computer readable program code embodied therein, which when executed causes a computer to implement a method pertaining to dynamically changing the probing frequency. An application input file is analyzed, and a resource consumption pattern is produced based upon the application's processing of the input file. The input pattern is related to application processing. A probing frequency for querying system resource availability is set, with the setting based upon the produced resource consumption pattern. System resource availability and the application resource utilization are both monitored to support processing the input file. The probing frequency is dynamically changed for one or more select periods of time as determined by the resource consumption pattern.

In an even further aspect, a method is provided for supporting balancing probing resource availability with mitigating placement of a burden on the system associated with the probing. An application input file is analyzed, and an associated resource consumption pattern based upon the analysis is produced. A frequency for querying system resource availability is established. The frequency is based on the produced consumption pattern. The established frequency is dynamically changed for one or more select periods of time, with the change determined by the resource consumption pattern. More specifically, the dynamic change is based upon the predicted application resource utilization for processing the application input file.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with managers and a director. The functional unit may be implemented in programmable hardware devices such as field programmable gate arrays, programmable array logic, programmable logic devices, or the like. The functional unit may also be implemented in software for execution by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

An application requires data input for processing. In one embodiment, an application input file contains input data that an application will use for execution and processing. Over the course of processing, an application may consume different quantities of resources at different stages of execution. A resource consumption pattern is one form of illustrating consumption of resources by an application during processing. More specifically, the resource consumption pattern is a representation of resource usage over time.

There are two categories of resource consumption patterns, including a theoretical pattern and an actual pattern. The theoretical pattern illustrates consumption over time on a theoretical basis, and the actual pattern illustrates the actual consumption of resources over time. In general, the consumption pattern is used to compare resources that will be needed for a given activity to continue for a certain period of time. One tool that is employed to assess the availability and consumption of resources during processing is a probe. Specifically, the probe is employed to check for available and used resources. However, the act of probing places a burden on system resources as it requires usage of resources that could otherwise be used for processing either the job that is the subject of the probe or another job that is processing. Accordingly, there is a need to mitigate the act of probing so that inefficiencies are reduced while resource availability is maximized.

Figure 1:
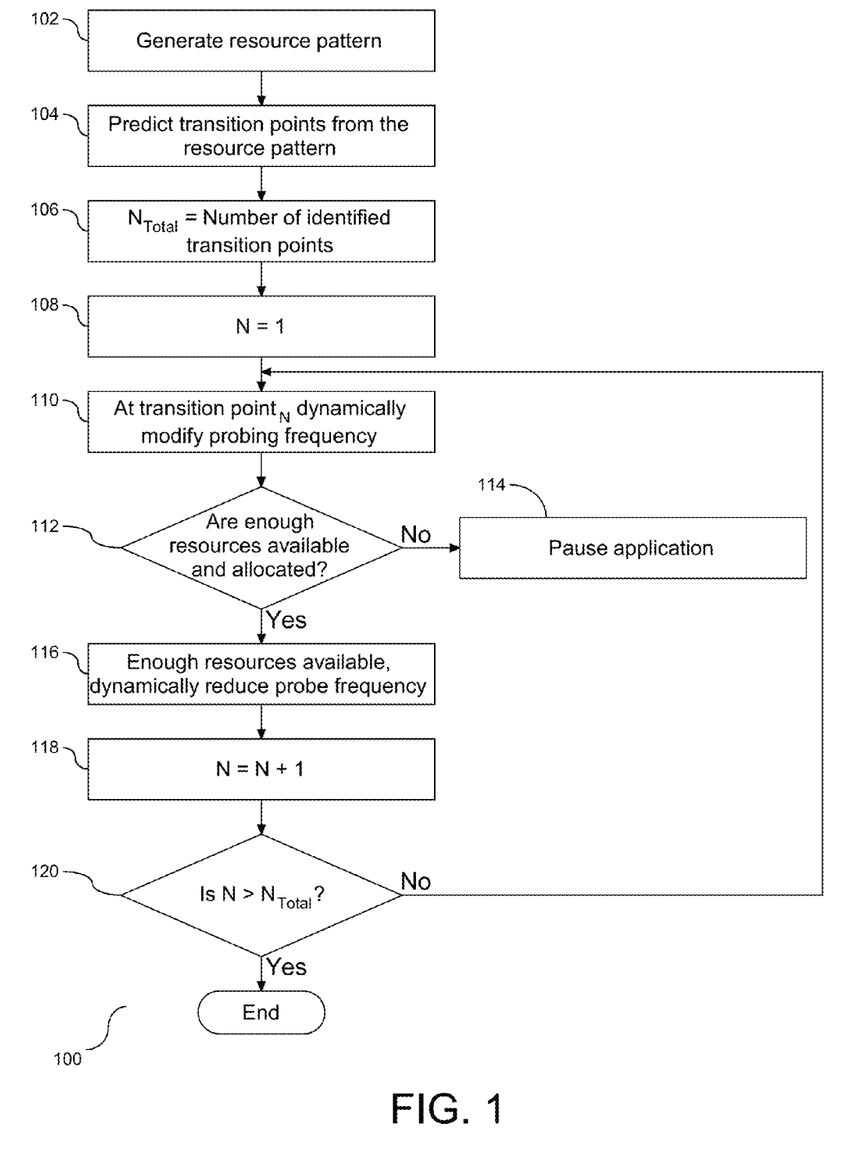
FIG. 1 is a flow chart illustrating a process for dynamically adjusting the frequency of probing for resource availability.

FIG. 1 is a flow chart (100) illustrating a process for dynamically adjusting the frequency of probing for resource availability. Prior to initiating any probing of resources, a resource usage pattern is generated (102). The resource usage pattern illustrates the usage of resources over the course of time associated with execution of a given activity. An example of a resource usage pattern is shown and described in FIG. 2. Each transition point in the pattern illustrates a predicted resource utilization. The transition point(s) are also individually known as a transition point. The transition points are predicted based upon the generated resource usage pattern, and can be detected as having occurred once the predicted amount of resource consumption has occurred. This transition point can mark a specific point in time where the job's resource usage is predicted to increase instantaneously (step function), or it can mark a short period of time where the job is predicted to continually increase resource usage. Thus, polling will be started (or increased) before the transition point occurs, and will continue until the predicted amount of the job's resource increase has occurred, after which it may be decreased (or stopped). (104). When the job's use of resource capacity is constant or decreasing, there is no need to probe for system resources. Accordingly, the act of probing may be mitigated based upon data from the generated resource pattern.

Each transition point in the resource pattern is identified, and probing is limited to one or more specific transition points identified in the resource pattern. More specifically, the quantity of transition points in the pattern is identified and assigned to the variable $N_{Total}$ (106), and an associated counting variable N is assigned to the integer one (108). At transition point N, the system's probing frequency is dynamically modified to an increased frequency (110). At such time as the system is probed, it is determined if enough resources are available and allocated to the processing application (112). A negative response to the determination at step (112) is followed by pausing the application being processed which is the subject of the probe (114). At such time as resources become available to support application processing, the pause will be lifted. However, a positive response to the determination at step (112) is an indication that there are enough resources available to support application processing (116), and as such no pausing of application processing is necessary. In addition, at step (116) the probing frequency may be dynamically decreased to a reduced frequency. Accordingly, at each identified transition point$_X$, availability of resources is evaluated together with application processing.

As shown above, there may be more than one transition point$_X$ identified in the resource pattern. Following the evaluation of the first transition point, the counting variable N is incremented (118). It is then determined if all of the transition points have been evaluated (120). A positive response to the determination at step (120) concludes the process of evaluating resource availability together with application processing. However, a negative response to the determination at step (120) is an indication that there is at least one more transition point in the resource pattern. The application continues to processing until the next transition point is reached (110). Accordingly, as each identified transition point is reached, the probing frequency is dynamically increased to ensure that the resources are available to support application processing.

By generating the resource usage pattern, the probing frequency of available resources may be dynamically modified at select transition points. The ability to dynamically modify the probing at select points in time reduces overhead on the system as a whole. Each time the system is probed, an extra burden is placed on the system. By mitigating the quantity of probes to the system, resources that may be utilized during probing may be available for other uses. Accordingly, the dynamic adjustment of the probing frequency enables intelligent probing and usage of system resources.

Figure 2:
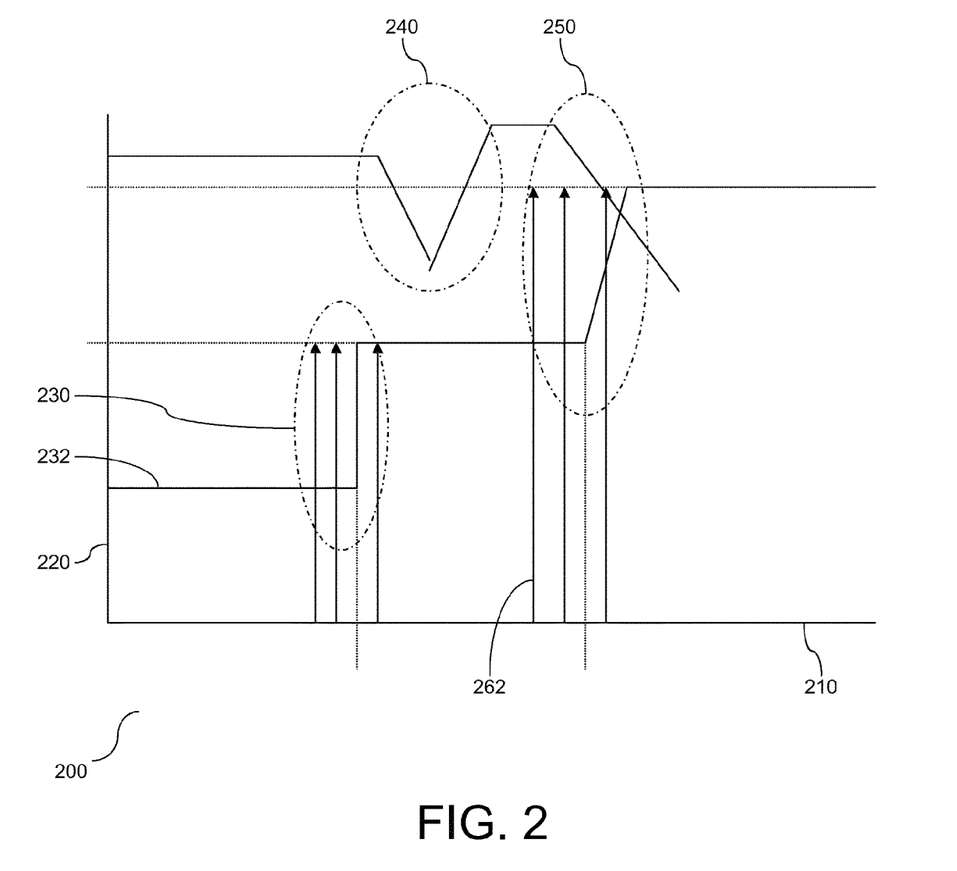
FIG. 2 a graph illustrating an example of a resource pattern and an associated intelligent use of dynamic probing.

FIG. 2 is a graph (200) illustrating an example of a resource pattern and an associated intelligent use of dynamic probing. As explained above, the resource pattern illustrates the job's predicted resource utilization over the course of time. Job execution time is shown on one axis (210), and resource utilization is shown on a second axis (220). In the example shown herein, there are two transition points identified in the resource pattern (230) and (250). When the application is processing prior to the first transition point (230), it is using a constant quantity of resources (232), and thus the probing is limited to the time adjacent to the first transition point. Since the polling determines enough system resources are available, the application is not paused.

Following the first transition point (230) and prior to reaching the second transition point (250), the application continues processing and the probing is discontinued. If a decrease in available system resources occurs (240), the application will not be paused because the polling for the second transition point has not started. By not requiring resources before they are needed for the application, the system can effectively utilize these resources. The application continues processing, and before the next transition point occurs, probing for system resource availability is re-started (262) to ensure that there is a sufficient quantity of resources available to support application processing. At this point, the resources available on the system is shown to be less than the predicted amount of needed resources, and the application will be paused so corrective action can be taken. Accordingly, as demonstrated at each transition point where the predicted amount of resources needed by the application increases, the system is probed to ensure that there is a sufficient quantity of resources available to support processing of the application.

As shown herein, the act of probing places a burden on the system since probing utilizes system resources. By generating a resource pattern, the probing is dynamically modified and limited to identified transition points in the application processing. The probing is employed responsive to the resource pattern. At such time as the probing is in an inactive state, resources may be allocated to support the subject application or other applications.

Figure 3:
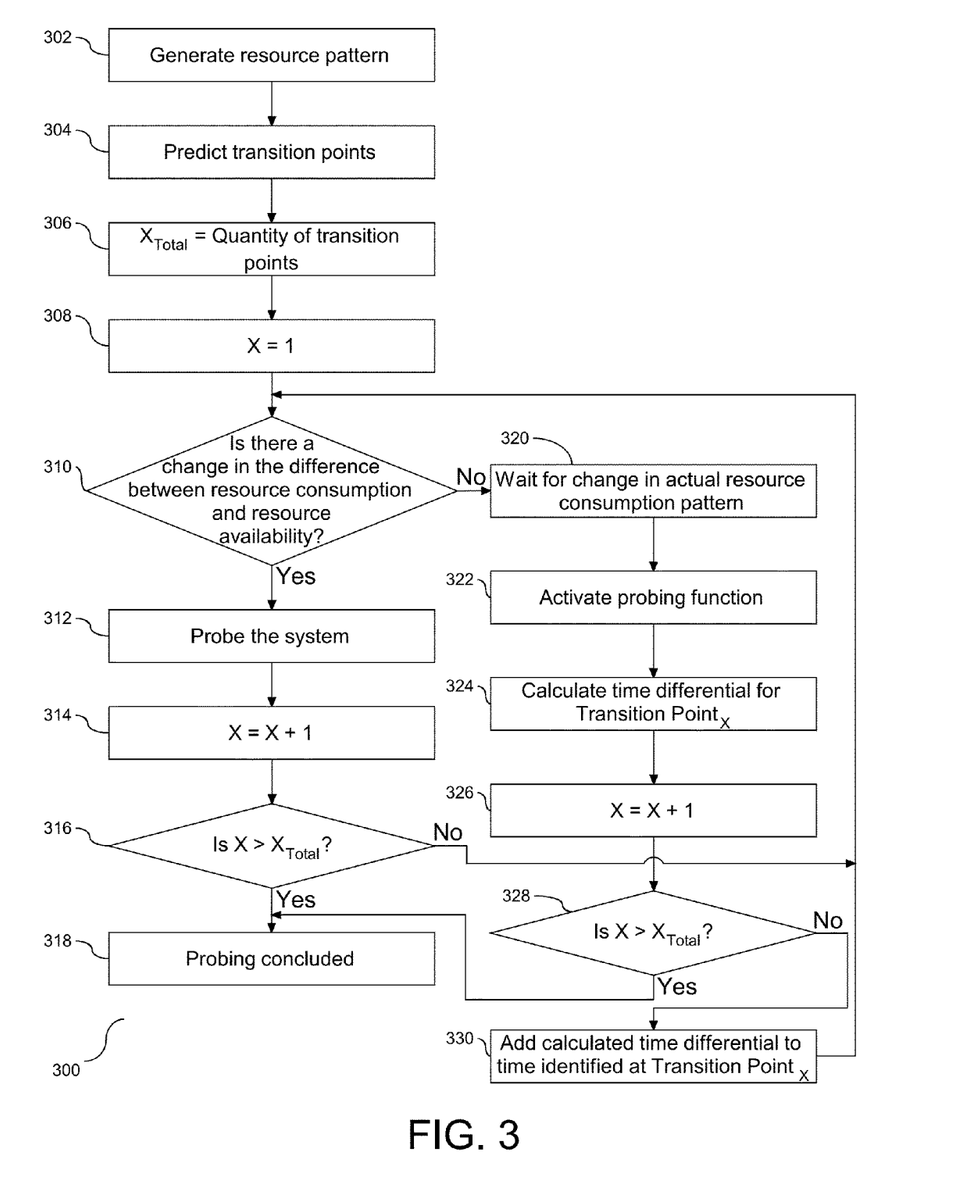
FIG. 3 is a flow chart illustrating a process for dynamically adjusting the timing of the probing with respect to processing of the application.

The act of probing in response to the generated resource pattern is dynamic. As shown above, the resource pattern is ascertained and the probing is modified in response to identified transition points in the resource pattern. However, the resource pattern is generated prior to application processing, and actual processing of the application may affect the timing of the identified transition points. FIG. 3 is a flow chart (300) illustrating a process for dynamically adjusting the timing of the probing with respect to processing of the application. A resource pattern is generated for the application (302), and transition points are predicted based upon the generated resource usage pattern (304). The variable $X_{Total}$ is assigned to the quantity of predicted transition points (306), and an associated counting variable, X, is assigned to the integer one (308). The application processes over time. As a transition point, identified in the resource pattern is reached, it is determined if there is an actual increase in the application's resource consumption (310). In one embodiment, a minimum capacity may be identified and the probing is initiated when the capacity threshold is reached. Accordingly, as shown herein the probing may be managed with respect to actual processing and not merely reflective of predicted processing.

A positive response to the determination at step (310) is followed by probing the system to ensure that the system has resource capacity available for the system to continue processing (312). Following step (312), the counting variable is increased (314), followed by determining if all of the identified transition points in the resource pattern have been evaluated (316). A positive response to the determination at step (316) concludes the probing evaluation process (318), and a negative response is followed by a return to step (310). As shown at step (312), the probing function is not dynamically activated if a capacity level has not been attained. In one embodiment, the resource pattern may not have properly identified the timing of the transition points and the probing function may need to be modified to the actual processing.

Following a negative response to the determination at step (310), the probing functionality waits for a change in the actual resource consumption pattern so that the timing of the transition points may be adjusted. When the actual first transition point is reached (320), the probing function is activated (322). At the same time, a time differential is calculated between the time when the probing function was activated at (322) and the time identified in the resource pattern for transition point$_x$ (324). Following step (324), the counting variable is increased (326), followed by determining if all of the identified transition points in the resource pattern have been evaluated (328). A negative response to the determination at step (328) is followed by adding the calculated time differential to the time identified at transition point$_x$ in the resource pattern (330) and a return to step (310), and a positive response concludes the probing process (318). Accordingly, the operation at step (330) modifies the resource pattern so that the resource pattern reflects an actual processing pattern.

Figure 4:
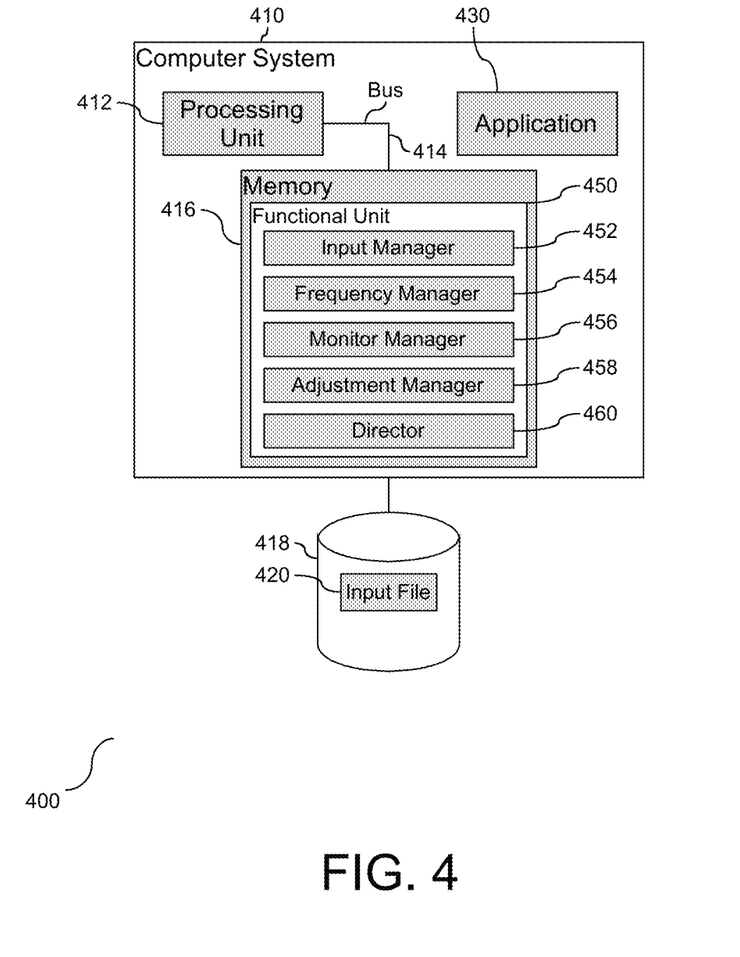
FIG. 4 is a block diagram illustrating tools embedded in a computer system to support the dynamic activation of a probing function with respect to resource capacity and resource utilization.

As shown, a resource pattern is acquired and the system supporting the application is dynamically probed based upon the resource pattern. FIG. 4 is a block diagram (400) illustrating tools embedded in a computer system to support the dynamic activation of a probing function with respect to resource capacity and resource utilization. As shown, a computer system (410) is provided with a processing unit (412) in communication with memory (416) across a bus (414) in communication with data storage (418). In one embodiment, data storage (418) may be remote from the system (410). The computer system (410) supports application processing. In the example shown herein, the application (430) is local to the system (410). However, the invention should not be limited to the locale of the application (430). The system (410) is provided with a functional unit (450), local to memory (416), having tools to support dynamic probing of system resources to support application processing. The tools include, but are not limited to, an input manager (452), a frequency manager (454), a monitor manager (456), an adjustment manager (458), and a director (460).

The input manager (452) is responsible for analyzing an input pattern for an application input file (420). In one embodiment, data to support application processing originates with the application input file (420). In the example shown herein, the input file (420) is local to the data storage (418). The input pattern is related to application processing associated with data from the input file (420). The input manager (452) produces a resource consumption pattern based upon the input pattern. The resource consumption pattern is a projection of resource usage to support application processing. The frequency manager (454) is provided in communication with the input manager (452). To mitigate unnecessary use of system resources, the frequency manager (454) employs the generated resource consumption pattern to set a probe frequency to query system resource availability to support application processing. More specifically, the frequency manager (454) sets the probe frequency with respect to the generated resource consumption pattern. Accordingly, the input manager (452) and the frequency manager (454) function to reduce the frequency at which application resources are probed.

The monitor manager (456) is provided in communication with the frequency manager (454). Specifically, the monitor manager (456) functions to monitor both system resource availability and application resource utilization in view of the application input file (420). A system is provided with a limited quantity of resources. As the application utilizes system resources, the availability of remaining resources is reduced. The director (460), which is provided in communication with the monitor manager (456), functions to dynamically modify the probe frequency for one or more select periods of time as determined by the resource consumption pattern. More specifically, the director (460) limits the probe frequency to distinct time periods. By dynamically modifying the probe frequency, the director (460) can increase the frequency at a defined critical point in the resource consumption pattern. In one embodiment, the critical point is an unexpected decrease in availability of system resources. Conversely, the director (460) can decrease the frequency based upon availability of resources to support application processing. As shown in FIG. 2, during the time periods where no increase in resource utilization is predicted, the probing frequency may be decreased. Accordingly, the director (460) functions to support the dynamic nature of the probe.

The frequency of probing is dynamically adjustable with respect to the resource consumption pattern. In one embodiment, the probing may be dynamically modified based upon actual usage of system resources and not on a pattern generated prior to application processing. The adjustment manager (458) is provided in communication with the director (460) to support the dynamic functionality of the probe in real-time. More specifically, the adjustment manager (458) functions to adjust the select periods of time for probing based on a feedback loop. As shown in FIG. 3, the feedback loop takes into account resource availability assessed in real-time, so that the director (460) can dynamically set the frequency probe based upon actual resource capacity. Accordingly, the director (460) may dynamically manage the frequency of the probe based upon the resource pattern and/or real-time evaluation of resource capacity.

As shown herein, the managers and director (452)-(460) of the functional unit (450) are provided local to the system (410), and more specifically, residing in memory (416) of the system (410). In one embodiment, the managers and director may reside as hardware tools external to memory (416), or they may be implemented as a combination of hardware and software. Similarly, in one embodiment, the managers and director may be combined into a single functional item that incorporates the functionality of the separate items. As shown herein, each of the managers and director are shown local to one data site. However, in one embodiment they may be collectively or individually distributed across a shared pool of configurable computer resources and function as a unit to manage one or more tasks and task related activity in real-time. Accordingly, the managers and director may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium and a computer readable signal medium are mutually exclusive. A computer readable storage medium may be, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store programmable logic for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
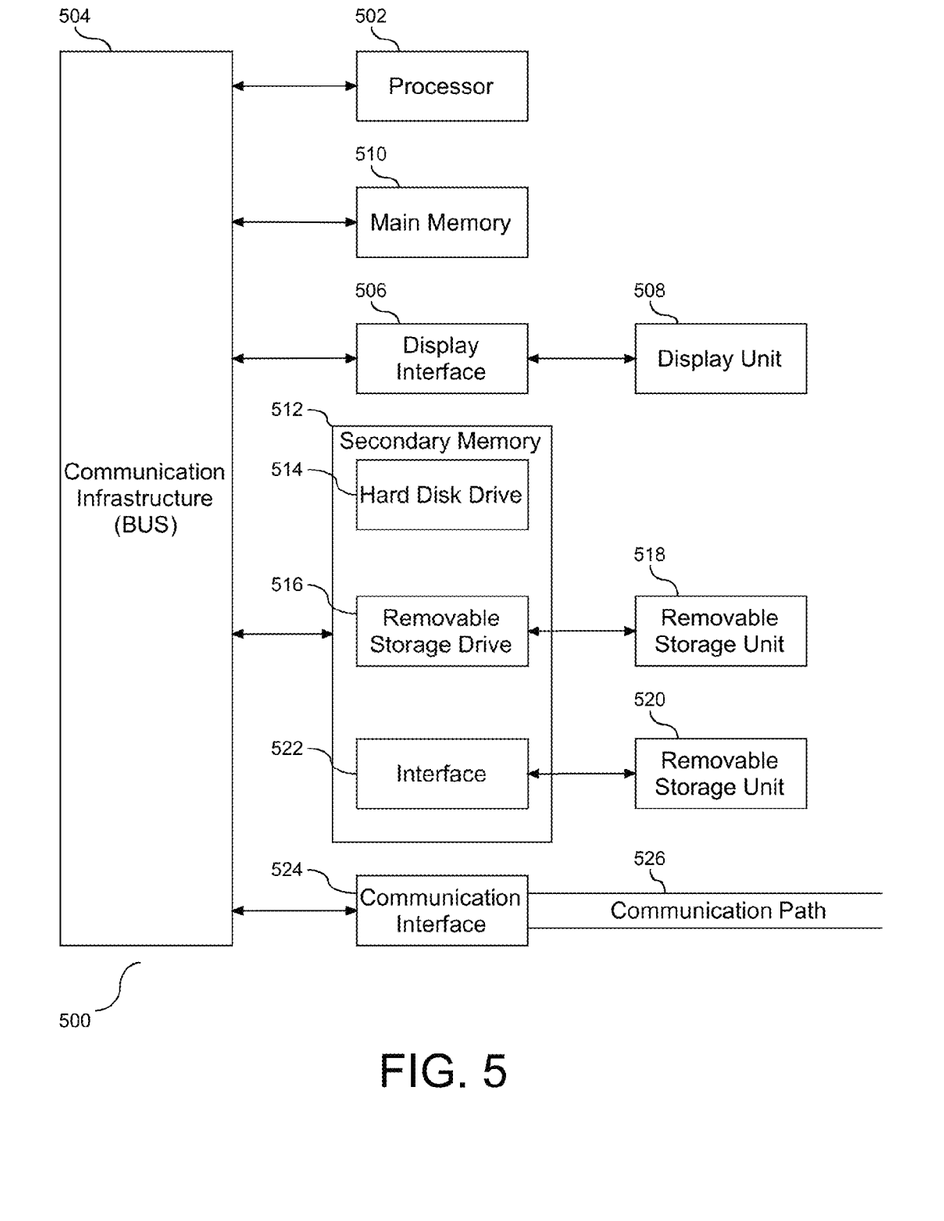
FIG. 5 depicts a block diagram showing a system for implementing an embodiment of the present invention.

Referring now to the block diagram of FIG. 5, additional details are now described with respect to implementing an embodiment of the present invention. The computer system includes one or more processors, such as a processor (502). The processor (502) is connected to a communication infrastructure (504) (e.g., a communications bus, cross-over bar, or network).

The computer system can include a display interface (506) that forwards graphics, text, and other data from the communication infrastructure (504) (or from a frame buffer not shown) for display on a display unit (508). The computer system also includes a main memory (510), preferably random access memory (RAM), and may also include a secondary memory (512). The secondary memory (512) may include, for example, a hard disk drive (514) and/or a removable storage drive (516), representing, for example, a floppy disk drive, a magnetic tape drive, or an optical disk drive. The removable storage drive (516) reads from and/or writes to a removable storage unit (518) in a manner well known to those having ordinary skill in the art. Removable storage unit (518) represents, for example, a floppy disk, a compact disc, a magnetic tape, or an optical disk, etc., which is read by and written to by removable storage drive (516). As will be appreciated, the removable storage unit (518) includes a computer readable medium having stored therein computer software and/or data.

In alternative embodiments, the secondary memory (512) may include other similar means for allowing computer programs or other instructions to be loaded into the computer system. Such means may include, for example, a removable storage unit (520) and an interface (522). Examples of such means may include a program package and package interface (such as that found in video game devices), a removable memory chip (such as an EPROM, or PROM) and associated socket, and other removable storage units (520) and interfaces (522) which allow software and data to be transferred from the removable storage unit (520) to the computer system.

The computer system may also include a communications interface (524). Communications interface (524) allows software and data to be transferred between the computer system and external devices. Examples of communications interface (524) may include a modem, a network interface (such as an Ethernet card), a communications port, or a PCMCIA slot and card, etc. Software and data transferred via communications interface (524) are in the form of signals which may be, for example, electronic, electromagnetic, optical, or other signals capable of being received by communications interface (524). These signals are provided to communications interface (524) via a communications path (i.e., channel) (526). This communications path (526) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (510) and secondary memory (512), removable storage drive (516), and a hard disk installed in hard disk drive (514).

Computer programs (also called computer control logic) are stored in main memory (510) and/or secondary memory (512). Computer programs may also be received via a communication interface (524). Such computer programs, when run, enable the computer system to perform the features of the present invention as discussed herein. In particular, the computer programs, when run, enable the processor (502) to perform the features of the computer system. Accordingly, such computer programs represent controllers of the computer system.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In one embodiment, multiple applications may be processing data on the system at the same time, with each application utilizing system resources. The resource consumption patterns of multiple applications may be combined to account for resource availability with respect to resource capacity of the applications. Accordingly, the scope of protection of this invention is limited only by the following claims and their equivalents.

We claim:

1. A method comprising:
analyzing an application input file and producing a theoretical resource consumption pattern based upon the input file, wherein the theoretical resource consumption pattern is related to processing by the application of the input file;
setting a probing frequency for querying system resource availability in response to the produced theoretical resource consumption pattern;
monitoring both system resource availability and actual application resource utilization for processing the application input file and producing an actual resource consumption pattern;
identifying one or more transition points based on the actual resource consumption pattern, wherein the one or more transition points reflect a point in time when resource consumption is predicted to change;
dynamically changing the probing frequency with respect to one or more identified transition points, wherein the change is selected from the group consisting of: increasing the probing frequency and decreasing the probing frequency; and
probing at least one system resource with the changed probing frequency before the transition point is reached and continuing probing at the changed probing frequency until a predicted amount of resources are available.

2. The method of claim 1, further comprising increasing the probing frequency with respect to the transition point reflecting an increase in resource utilization.

3. The method of claim 2, wherein the transition point precedes an expected increase in system resources needed for the application to process the application input file.

4. The method of claim 1, further comprising dynamically decreasing the probing frequency with respect to the transition point reflecting a decrease in resource utilization.

5. The method of claim 1, further comprising adjusting the probing frequency as determined by the resource consumption pattern based on a feedback loop.

6. The method of claim 5, wherein the feedback loop includes an actual pattern of resources consumed.

7. A system comprising:
a processor in communication with memory;
a functional unit in communication with the memory, the functional unit comprising:
an input manager analyzes an application input file, the input pattern being related to application processing, and produces a theoretical input resource consumption pattern based upon processing of the input file;
a frequency manager in communication with the input manager, the frequency manager sets a probing frequency to query system resource availability in response to the produced theoretical resource consumption pattern;
a monitor manager in communication with the frequency manager, the monitor manager monitors both system resource availability and actual application resource utilization for processing the application input file and producing an actual resource consumption pattern; and
a director in communication with the monitor manager, the director dynamically changes the probing frequency with respect to one or more transition points identified based on the actual resource consumption pattern, each transition point of the one or more transition points reflecting a point in time when resource consumption is predicted to change, wherein the change in the probing frequency is selected from the group consisting of: increasing the probing frequency and decreasing the probing frequency and
the frequency manager probing at least one system resource with the changed probing frequency before the transition point is reached and continuing probing at the changed probing frequency until a predicted amount of resources are available.

8. The system of claim 7, further comprising the director increases the probing frequency with respect to the transition point reflecting an increase in resource utilization.

9. The system of claim 8, wherein the transition point precedes an expected increase in system resources needed for the application to process the application input file.

10. The system of claim 7, further comprising the director decreases the probing frequency with respect to the transition point reflecting a decrease in resource utilization.

11. The system of claim 7, further comprising an adjustment manager in communication with the director, the adjustment manager adjusts the probing frequency as determined by the resource consumption pattern based on a feedback loop.

12. The system of claim 11, wherein the feedback loop includes an actual pattern of resources consumed.

13. A computer program product comprising a computer readable storage medium having computer readable program code embodied therein, which when executed on a processor causes a computer to implement the method comprising:
 analyzing an application input file;
  producing a theoretical resource consumption pattern based upon processing of the analyzed input file;
 setting a probing frequency for querying system resource availability in response to the produced theoretical resource consumption pattern;
 monitoring both system resource availability and actual application resource utilization for processing the application input file and producing an actual resource consumption pattern;
 identifying one or more transition points based on the actual resource consumption pattern, wherein the one or more transition points reflect point in time when resource consumption is predicted to change;
 dynamically changing the probing frequency with respect to one or more identified transition points, wherein the change is selected from a group consisting of: increasing the probing frequency and decreasing the probing frequency; and
 probing at least one system resource with the changed probing frequency before the transition point is reached and continuing probing at the changed probing frequency until a predicted amount of resources are available.

14. The computer program product of claim 13, wherein dynamically changing the probing frequency includes increasing the probing frequency with respect to the transition point reflecting an increase in resource utilization.

15. The computer program product of claim 14, wherein the transition point precedes an expected increase in system resources available needed for the application to process the application input file.

16. The computer program product of claim 13, wherein dynamically changing the probing frequency includes decreasing the probing frequency with respect to the transition point identified in the resource consumption pattern, reflecting a decrease in resource utilization.

17. The computer program product of claim 13, further comprising adjusting the probing frequency as determined by the resource consumption pattern based on a feedback loop.

18. The computer program product of claim 17, wherein the feedback loop includes an actual pattern of resources consumed.

19. A method comprising:
 analyzing an application input file for an input pattern and producing a theoretical resource consumption pattern based upon the input pattern of the input file, wherein the input pattern is related to application processing;
 establishing a frequency for querying system resource availability, wherein the frequency is based on the produced theoretical consumption pattern;
 monitoring both system resource availability and actual application resource utilization for processing the application input file and producing an actual resource consumption pattern;
 identifying one or more transition points based on the actual resource consumption pattern, wherein the one or more transition points reflect a point in time when resource consumption is predicted to change;
 dynamically changing the established frequency with respect to one or more identified transition points wherein the change is selected from the group consisting of: increasing the established frequency and decreasing the established frequency; and
 probing at least one system resource with the changed frequency before the transition point is reached and continuing probing at the changed frequency until a predicted amount of resources are available.

* * * * *